May 12, 1925.  1,537,277
P. Q. WILLIAMS
LEER CONVEYER MECHANISM
Filed July 29, 1922 6 Sheets-Sheet 1

Inventor
Percy Q. Williams
By Walter F. Murray
Attorney

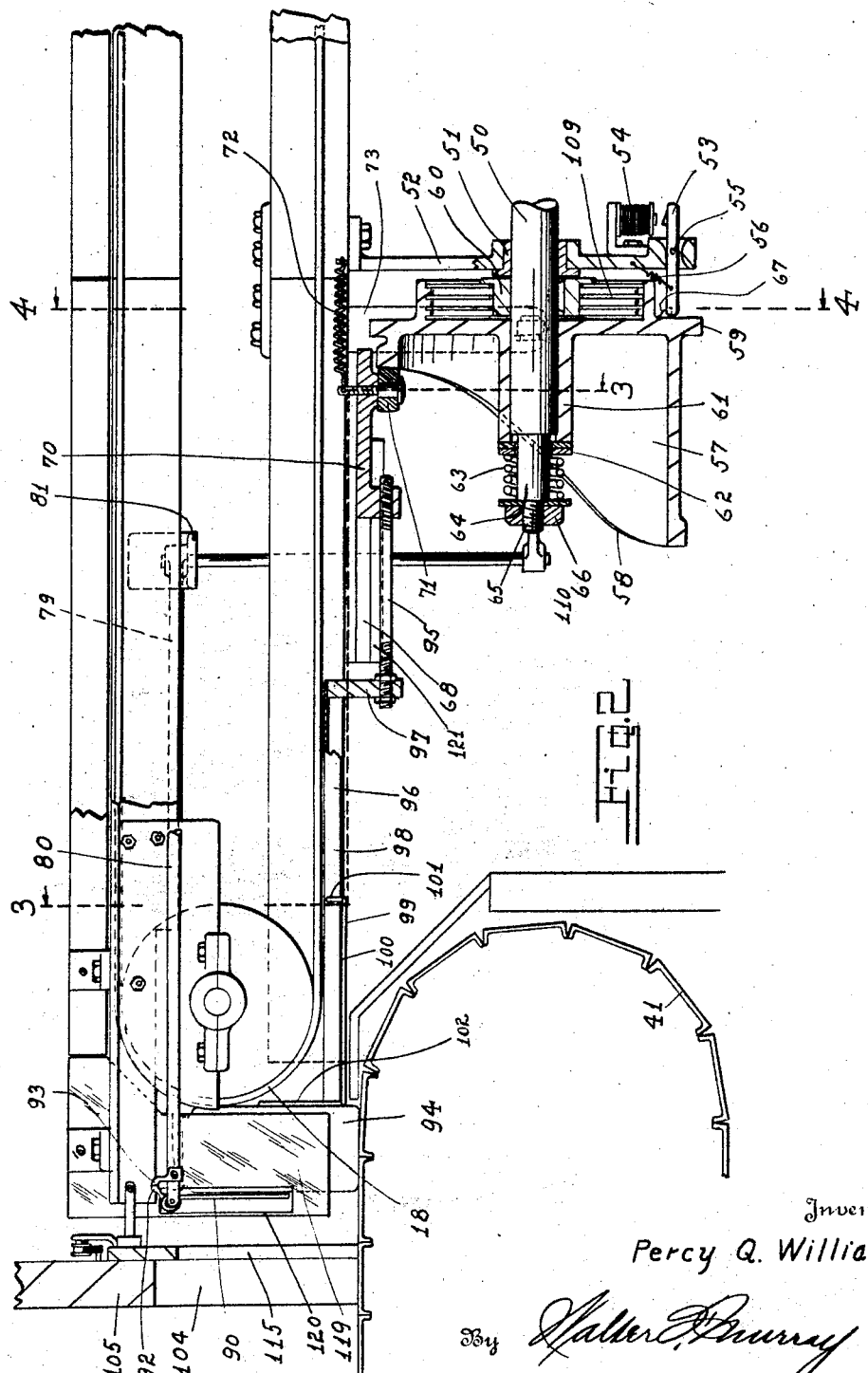

May 12, 1925.  
P. Q. WILLIAMS  
LEER CONVEYER MECHANISM  
Filed July 29, 1922
1,537,277  
6 Sheets-Sheet 3
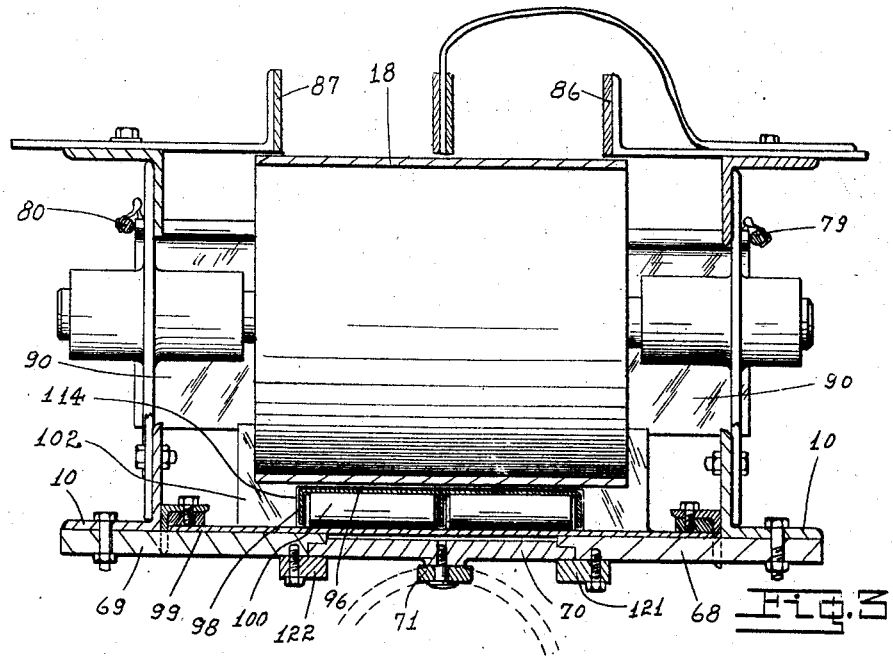
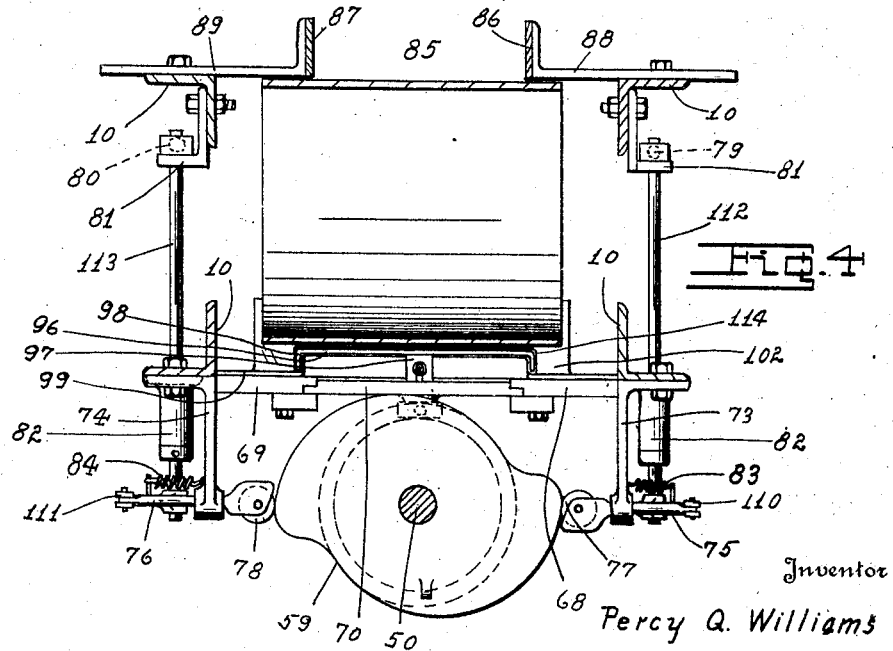
Inventor  
Percy Q. Williams  
By *Walter F. Murray*  
Attorney May 12, 1925.
P. Q. WILLIAMS
1,537,277
LEER CONVEYER MECHANISM
Filed July 29, 1922    6 Sheets-Sheet 4
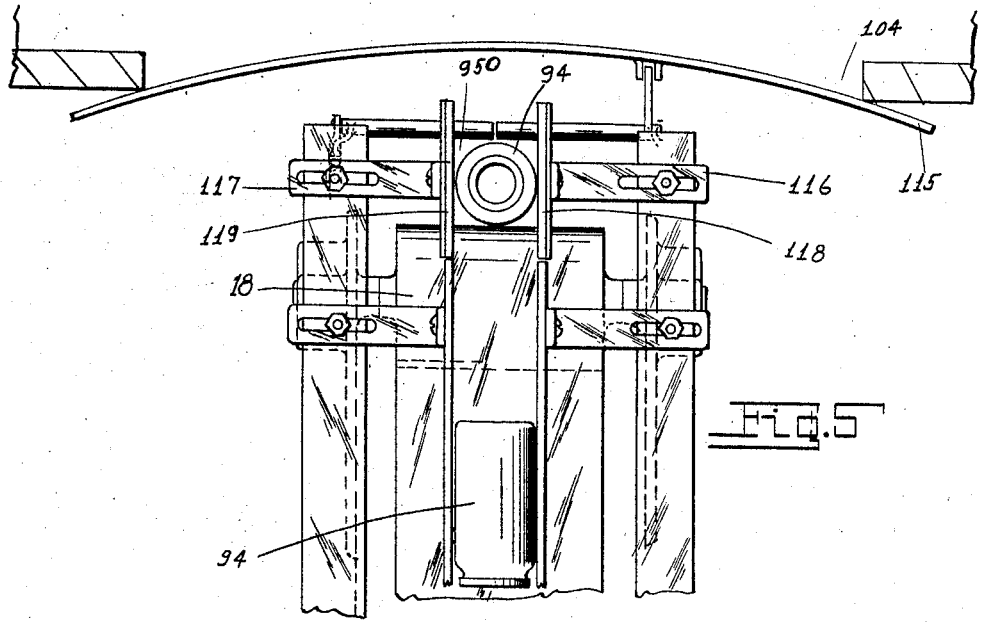
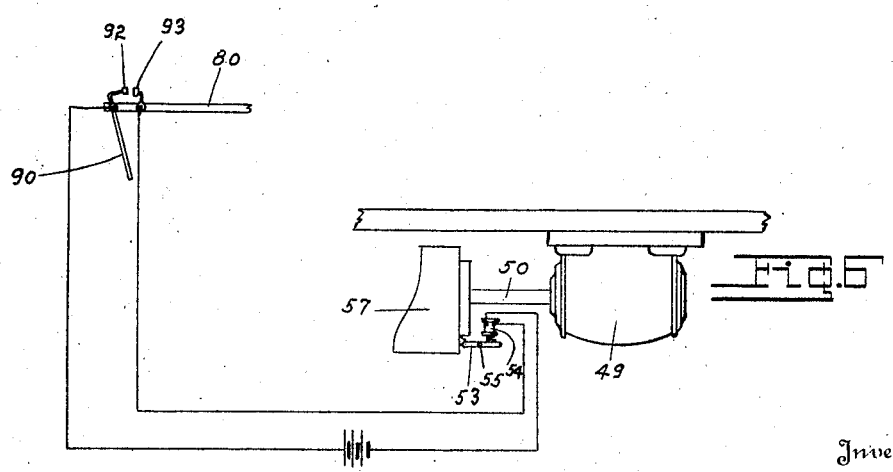
Inventor
Percy Q. Williams
By *Walter F. Murray*
Attorney

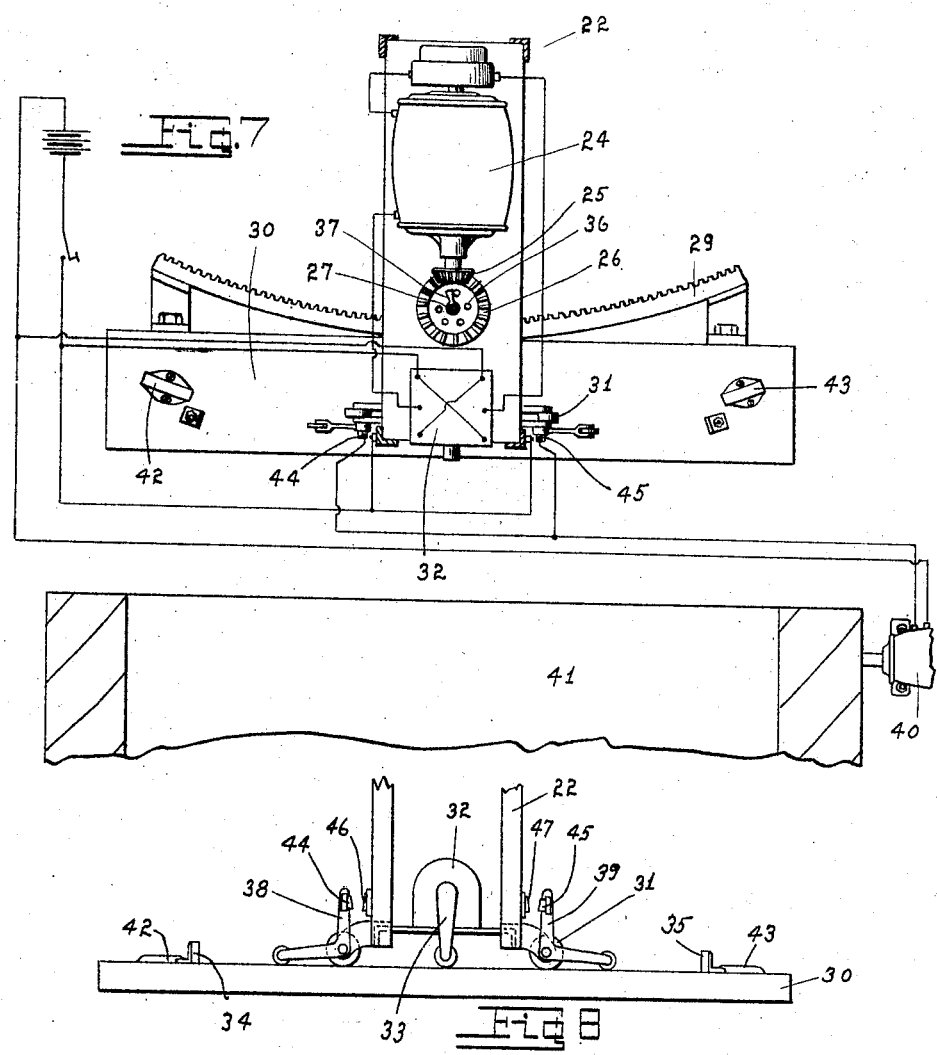

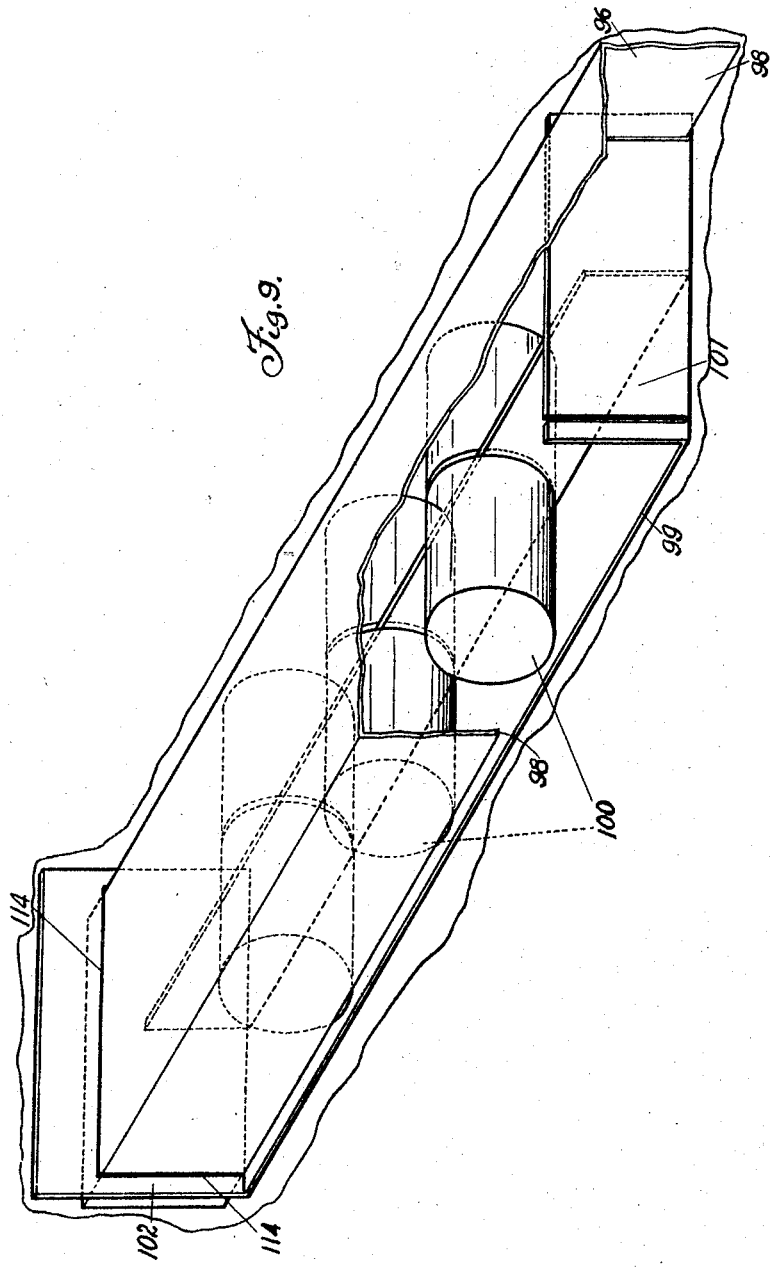

Patented May 12, 1925.

1,537,277

UNITED STATES PATENT OFFICE.

PERCY Q. WILLIAMS, OF CINCINNATI, OHIO.

LEER-CONVEYER MECHANISM.

Application filed July 29, 1922. Serial No. 578,406.

*To all whom it may concern:*

Be it known that I, PERCY Q. WILLIAMS, a citizen of the United States of America, and a resident of Cincinnati, in the county of Hamilton and State of Ohio, have invented a new and useful Improvement in a Leer-Conveyer Mechanism, of which the following is a specification.

My invention relates to devices employed in conveying medium sized glass ware from a bottle machine to a leer, and for depositing the ware upon its base in the leer.

I have disclosed in my co-pending applications Serial Number 565,733, filed June 3, 1922, and Serial Number 516,518 filed November 21st, 1921, devices for transferring small ware and large ware from bottle machines to conveyers. Machines of this type are capable of functioning properly between certain limits, the limits being determined by the size and nature of the ware.

An object of my invention is to provide a device capable of expeditiously and economically handling jars of the general type of which the quart Mason jars are samples.

Another object of my invention is to provide a device which will handle ware of the class described, and which may be interchangeably associated with certain mechanisms common to conveyers of this type, whereby it is possible to use the same leers for various types of bottles.

These and other objects are attained by means described herein and disclosed in the accompanying drawing, in which:

Fig. 2 is an enlarged view of parts shown in Fig. 1, parts shown in section.

Fig. 3 is a sectional view on line 3—3 of Fig. 2.

Fig. 4 is a sectional view on line 4—4 of Fig. 2.

Fig. 5 is a plan view of parts shown in Fig. 3.

Fig. 6 is a side elevation of parts shown in Figs. 1 and 2, showing somewhat diagrammatically the relation of parts and an electrical circuit forming a detail of my invention.

Fig. 7 is a plan view on line 7—7 of Fig. 1, showing diagrammatically the wiring thereof.

Fig. 8 is an end view of parts shown in Fig. 7.

Fig. 9 is a perspective view of a plunger plate and mounting therefor, all of which form details of my invention.

Figure 1:
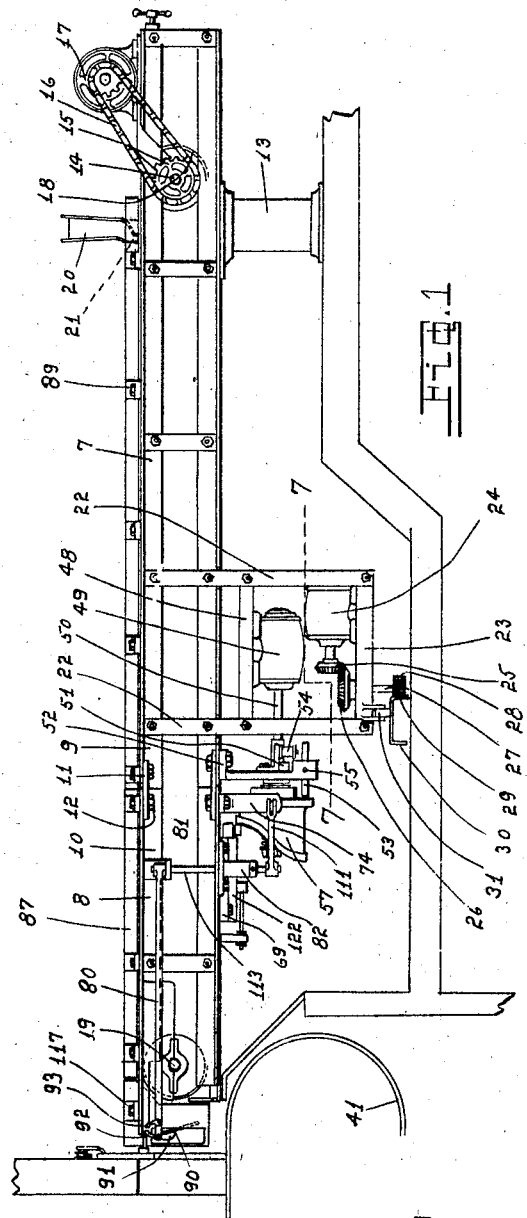
Fig. 1 is a side elevation showing a device embodying my invention.

The main frame 7 carries at its rear end an auxiliary frame 8. The auxiliary frame is removably mounted upon the main frame as explained in my co-pending application, Serial #565,732, filed June 3, 1922. Briefly this mounting may be described as comprising the following structure: The main frame comprises longitudinally extending angle bars 9, at the rear end of which, angle bars 10 of the auxiliary frame 8 are mounted by means of brackets 11 and suitable bolts 12. The forward end of the main frame is pivotally mounted on a tubular support 13 and is adapted to be oscillated thereupon. A shaft 14 carried by the forward end of the main frame has mounted on it a sprocket 15 engaged by a chain 16 driven from the motor 17 mounted on the forward end of the main frame 7. An endless conveyer belt 18 adapted to be driven from the shaft 14 extends longitudinally of the main frame and the auxiliary frame, and its rear end extends about a shaft 19 carried by the auxiliary frame 8. The belt 18 is removably mounted about the shafts 14 and 19, whereby various types of belts may be employed with the conveyer mechanism carried by the main frame 7, and whereby various discharging ends or auxiliary frames may be employed with the main frame. The motor 17 may be adjusted longitudinally of the main frame 7 as is disclosed in my copending application, whereby to adjust the tension of the conveyer belt 18. A chute 20 is adapted to receive ware from a bottle machine and to direct the ware upon the belt 18. The lower end 21 of the chute 20 curves toward the rear of the frames whereby to discharge the ware upon the belt in such position that the ware will extend lengthwise of the frame, and have its base disposed toward the auxiliary frame 8. Adjacent the rear end of the main frame are mounted downwardly extending standards 22 which support at their lower end a platform 23.

A motor 24 mounted on the platform 23 carries a bevel gear 25 in engagement with a bevel gear 26 mounted on the upper end of a shaft 27 extending thru the platform 23. The lower end of the shaft 27 carries a gear 28 which engages an arcuate rack 29 carried by a vertically adjustable channel bar 30. The platform carries rollers 31 which ride upon the channel 30 and support the platform. The platform also carries a reversing switch 32 controlling the motor 24, which controlling switch has an arm 33 adapted to engage blocks 34 and 35 mounted on the channel adjacent the opposite ends thereof. The bevel gear 26 may be revolubly mounted on the shaft 27 and may carry pins 36 which may be engaged by a lug 37 mounted on the upper end of the shaft 27, whereby to render the frame temporarily stationary at its opposite limits of oscillation. The platform also carries contact arms 38 and 39 whereby to close circuits embracing a motor 40 adapted to actuate the leer conveyer 41. The contact arms are adapted to engage cams 42 and 43 mounted on the channel adjacent the opposite ends thereof, whereby to bring the contacts 44 and 45 carried by said contact arms into electrical communication with contacts 46 and 47 carried by the platform. The contacts 44, 45, 46 and 47 are embraced in the circuit embracing the motor 40. The standards 22, carry intermediate their ends, cross bars 48, upon which is mounted a motor 49. The rear end of the shaft 50 extending from the motor 49 is supported by a suitable bearing 51 carried by a bracket 52 mounted on the main frame adjacent the rear and lower end thereof. The bracket 52 carries adjacent its lower edge a pivotally mounted lug 53. The bracket also carries an electromagnet 54 adapted to operate upon the lug 53, and to move the lug about its pivotal mounting 55. A spring 56 yieldingly retains the lug 53 in its normal position as shown in Fig. 2. The rear end of the shaft 50 carries a double cam 57 having cam faces 58 and 59. Friction discs 109 are carried by a collar 60 mounted on the shaft 50 and are adapted to transmit motion from the collar 60 to the cam 57. The collar 60 is adapted to move with the shaft 50. The cam has a hub 61 thru which extends an axial bore accommodating the shaft 50 and from the rear end of which the shaft 50 extends. Washers 62 carried by the shaft 50 abut the rear end of the hub 61 and are held in engagement with the hub by the spring 63 mounted on the intermediate reduced portion 64 of the shaft 50. The rear reduced portion 65 of the shaft 50 carries a nut 66 against which the spring 63 abuts. The cam carries a lug 67 adapted to be engaged by the pivotally mounted lug 53, whereby the cam 57 is normally restrained against movement with the shaft 50. When the electro magnet is energized so as to move the lug 53 upon its pivotal mounting and to withdraw the rear end of the lug 53 from the path of the lug 67, the cam revolves with the shaft 50. The motor 49, the shaft 50 and the cam mounted on the shaft are adapted to remain upon the main frame although the auxiliary frame disclosed herein, is removed and a different auxiliary frame, such as disclosed in my co-pending application, is mounted upon the frame. The auxiliary frame disclosed herein carries guide rails 68 and 69 which together with strips 121 and 122 slidably support a block 70. The block 70 carries a roller 71 held in yielding engagement upon the cam face 58 by a spring 72. Immediately to the front of the rails 68 and 69, there are mounted on the lower angle bars 10 of the auxiliary frame 8, brackets 73 and 74. The brackets 73 and 74 have bores formed in them, the bores extending in diametric alignment with the shaft 50, and having reciprocally mounted within them rods 75 and 76 carrying at their inner end rollers 77 and 78 engaging upon the cam face 59. The outer ends of the rods are pivotally connected to the forward ends of arms 110 and 111, which arms are mounted at their rear ends upon vertical shafts 112 and 113. Brackets 81 and 82 mounted upon the upper and lower angle bars 10 of the auxiliary frame form bearings for the vertical shafts 112 and 113. Arms 79 and 80 have their forward ends connected to the upper ends of the vertical shafts 112 and 113, respectively. Springs 83 and 84 have their opposite ends mounted upon bracket 73 and rod 75, and bracket 74 and rod 76 respectively. A way 85 extends longitudinally of the main and auxiliary frames and its side walls are defined by bars 86 and 87 extending longitudinally of the frames, and which are supported by suitable brackets 88 and 89 adjustably mounted upon the upper angle bars of the frames. The rear ends of the arms 79 and 80 carry pivotally mounted depending plates 90. The plates are weighted as shown in Fig. 1. The plates carry at their upper ends a finger 92 adapted to make an electrical contact upon the contact 93 mounted on the arm 80. The contacts 92 and 93 are embraced in a circuit embracing the electro magnet 54. The plates normally assume a position such that when a jar 94 reaches the rear end of the conveyer belt 18, and is lodged in a pocket 950 formed between the plates 90 and the engagement of the ware on the plates causes movement of one of the plates 90 about its pivotal mounting and completes the circuit between the contacts 92 and 93 whereby to energize the electro magnet and to cause the cam to move with the shaft 50. As the block 70 is moved rearwardly by the cam 57, the motion of the block is transmitted to the jar. This is effected by means of a screw rod 95 carried by the block 70 and a plunger plate 96 connected with the screw rod 95 by a link 97. The plunger plate 96 has its side edges turned downwardly whereby to form flanges 98 which terminate immediately above the upper face of a bearing plate 99 carried by the lower angle bars 10 of the auxiliary frame. Pipe bearings 100 are contained between the bearing plate 99 and the plunger plate 96. The rear and forward ends of the bearing plate have flanges 101 and 102 formed on them, the forward flange 101 extending upwardly between the flanges 98 formed on the plunger plate, while the rear flange extends upwardly beyond the plunger plate and has slots 114 to accommodate the passing therethru of the plunger plate, the flanges 101 and 102 providing a confined race for the pipe bearings or rotors 100. The jars are adapted to be deposited directly upon that portion of the leer conveyer immediately in front of the leer face 105. The plunger plate 96 is adapted to be reciprocated immediately above the leer conveyer whereby to push the jars 94 thru an opening 104 provided in the face 105 of the leer. It is customary to provide leers with doors 115 which are slidable and reciprocable transversely of the leer conveyer, whereby to provide a leer opening in alignment with the conveyer comprising the main and auxiliary frames. The parts bear a relation such that immediately the electro magnet 54 is energized and the cam begins to revolve, the arms 79 and 80 are moved outwardly at their forward ends by means of the cam face 59 whereby to withdraw the plates 90 from the path thru which the plunger plate 96 is adapted to carry the jar 94. Suitable members 118 and 119 are provided whereby to form a way extending longitudinally of the auxiliary frame, thru which way the plunger plate may be reciprocated. The rear ends of the upper angle bars 10 carry brackets 116 and 117 carrying guide members 118 and 119 respectively. The guide members are adapted to extend downwardly and in continuity with the side walls 86 and 87 of the conveyer and to terminate in the pocket 95 thereby precluding the jars 94 from falling upon their sides. The guide members have slots 120 thru which the plates 90 may pass.

The operation of my device is as follows:

Ware is delivered to the belt 18 from a bottle machine by way of a chute 20 as previously explained. When the ware reaches the rear end of the belt 18, the ware is disposed in the pocket 950 thereby engaging the plates 90 enclosing the circuits thru the contacts 92 and 93. When the electro magnet 54 is energized, the lug 53 is disengaged from the lug 67 and the movement of the cam 57 serves to withdraw the plates 90 from their normal position whereupon the plunger plate projects the jar thru the leer door opening 104. When the frames carrying the belt reach either of their lateral limits the closing of the circuits thru the contacts carried by the channel bar and the platform 23 serves to actuate the leer conveyer motor, and the engagement of the reversing switch arm upon the blocks carried by the channel bar reverses the direction of the movement of the frames about the support 13. As soon as the plates have moved beyond the line of travel of the jars under the influence of the pusher plate, the circuit thru contacts 92 and 93 is broken, whereupon the spring 56 returns the lug 53 to its normal position and the engagement of the lug 67 upon the lug 53 precludes further movement of the plunger plate and of the arms. Springs 83, 84 and 72 return the arms 79 and 80 and plunger plate 96 to their normal positions. In event that a second jar should be discharged into the pocket 950 before the plunger plate has been returned to its normal position, the plates 90 will retain said jar until the plunger plate has been returned to its normal position whereupon the circuit embracing the electro magnet being closed, the parts will again function.

What I claim is:

1. In a device of the class described the combination of a leer, a leer conveyer, a conveyer adapted to carry ware on its side and to deposit the ware onto the leer conveyer exteriorly of the leer, and means to intermittingly move ware over the leer conveyer into the leer, the intermittingly actuating means being adapted to be controlled by the ware.

2. In a device of the class described the combination of a leer, a conveyer adapted to carry ware to the leer, means whereby to form a pocket into which the conveyer discharges the ware, means to move the ware from the pocket into the leer, and means associated with the pocket controlled by the ware adapted to control displacement of the pocket forming means whereby to permit unobstructed action of the ware moving means upon the ware.

3. In a device of the class described the combination of a conveyer having a way formed longitudinally thereof, an arm pivotally mounted adjacent the way having its one end disposed adjacent the end of the way, a pivotally mounted plate carried by said end of the arm normally extending in alignment with the way, whereby to form a pocket into which the way is adapted to discharge, means whereby to move the arm about its pivotal mounting whereby to withdraw the plate from alignment with the way, means associated with the plate adapted to be actuated by the discharge of ware in the pocket controlling the movement of the arm about its pivotal mounting whereby to move the arm and plate to an abnormal position wherein the plate is out of alignment with the way, and means to move the ware beyond the pocket after movement of the plate to an abnormal position.

4. In a device of the class described the combination of a frame, an endless belt carried by the frame adapted to carry ware, an arm pivotally mounted intermediate its ends upon the frame having its rear end extending beyond the belt, a plate pivotally mounted on the rear end of the arm, the arm being adapted to normally hold the plate in longitudinal alignment with the belt, whereby to form a pocket at the rear end of the belt into which pocket the belt is adapted to discharge ware, the plate bearing a relation to the pocket such that ware deposited in the pocket will move the plate about its pivotal mounting, a pair of electricity conducting contacts adapted to be brought into communication upon movement of the plate by the ware, an electro-magnet carried by the frame, an electrical circuit embracing the electro-magnet and the contacts, a shaft revolubly carried by the frame, a cam revolubly mounted on the shaft adapted to revolve therewith, a friction device mounted on the shaft adapted to operate on the cam, means to retain the cam against movement adapted to be moved to an inoperative position by the electro-magnet, means yieldingly retaining the forward end of the arm in engagement upon the cam, and means adapted to move the ware from the pocket.

5. In a device of the class described the combination of a frame, an endless belt carried by the frame adapted to carry ware, an arm pivotally mounted intermediate its ends upon the frame having its rear end extending beyond the belt, a plate pivotally mounted on the rear end of the arm, the arm being adapted to normally hold the plate in longitudinal alignment with the belt, whereby to form a pocket at the rear end of the belt into which pocket the belt is adapted to discharge ware, the plate bearing a relation to the pocket such that ware deposited in the pocket will move the plate about its pivotal mounting, a pair of electricity conducting contacts adapted to be brought into communication upon movement of the plate by the ware, an electro-magnet carried by the frame, an electrical circuit embracing the electro-magnet and the contacts, a shaft revolubly carried by the frame, a cam revolubly mounted on the shaft adapted to revolve therewith, a friction device mounted on the shaft adapted to operate on the cam, means to retain the cam against movement adapted to be moved to an inoperative position by the electro-magnet, means yieldingly retaining the forward end of the arm in engagement upon the cam, means adapted to move the ware from the pocket, and a plunger plate reciprocally mounted on the frame adapted normally to have its rear end disposed adjacent the forward end of the pocket and having its rear end in engagement upon the cam, the cam being adapted to move the arm about its pivotal mounting and to reciprocate the plunger plate.

6. A bearing mounting of the class described comprising a plate having its opposite ends turned upon itself whereby to form flanges extending in a common direction, a second plate having its side edges turned upon itself whereby to form flanges adapted to lie adjacent the flanges on the plates forming between them a confined chamber, and a number of rotors loosely disposed within the chamber.

7. In a device of the class described the combination of an endless conveyer having a way extending longitudinally thereof, a shaft revolubly mounted on the conveyer, a two faced cam revolubly mounted on the shaft, a friction device operatively mounted on the shaft adapted to operate on the cam, a pivotally mounted lug adapted normally to resist movement of the cam by the friction device, an arm pivotally mounted on the conveyer having one of its ends in yielding engagement upon one face of the cam and having its second end disposed adjacent one end of the conveyer, means carried by the second end of the arm adapted to be engaged by ware discharged from the conveyer, said means controlling the movement of the lug operative upon the cam, and a plunger reciprocally mounted on the conveyer engaging the second face of the cam adapted to move ware beyond the means carried by the second end of the arm.

8. In a device of the class described the combination of an endless conveyer, a shaft revolubly mounted on the conveyer, a cam revolubly mounted on the shaft, a friction device carried by the shaft adapted to impart movement to the cam, a lug normally resisting movement of the cam by the friction device, an arm pivotally mounted on the conveyer, means yieldingly retaining the forward end of the arm in engagement upon the cam, means carried by the rear end of the arm adapted to be engaged by ware discharged from the conveyer, an electrical contact carried by said means, a second contact, the first mentioned contact carrying means adapted to bring the contacts into engagement by engagement upon it of ware, an electro-magnet adapted to move the lug to an inoperative position whereupon the cam may be revolubly actuated by the friction device, an electrical circuit embracing the contacts and the electro-magnet, a plunger adapted to operate upon ware discharged by the conveyer controlled by the cam, the cam being adapted to move the arm upon its pivotal mounting prior to the operation of the plunger upon the ware, and means to actuate the shaft.

9. In a device of the class described the combination of an endless conveyer, a shaft revolubly mounted on the conveyer, a cam revolubly mounted on the shaft, a friction device carried by the shaft adapted to impart movement to the cam, a lug normally resisting movement of the cam by the friction device, an arm pivotally mounted on the conveyer, means yieldingly retaining the forward end of the arm in engagement upon the cam, means carried by the rear end of the arm adapted to be engaged by ware discharged from the conveyer, an electrical contact carried by said means, a second contact, the first mentioned contact carrying means adapted to bring the contacts into engagement by engagement upon it of ware, an eletro-magnet adapted to move the lug to an inoperative position whereupon the cam may be revolubly actuated by the friction device, an electrical circuit embracing the contacts and the electro-magnet, a plunger adapted to operate upon ware discharged by the conveyer controlled by the cam, the cam being adapted to move the arm upon its pivotal mounting prior to the operation of the plunger upon the ware, and means to oscillate the conveyer.

10. In a device of the class described the combination of an endless conveyer, a shaft revolubly mounted on the conveyer, a cam revolubly mounted on the shaft, a friction device carried by the shaft adapted to impart movement to the cam, a lug normally resisting movement of the cam by the friction device, an arm pivotally mounted on the conveyer, means yieldingly retaining the forward end of the arm in engagement upon the cam, means carried by the rear end of the arm adapted to be engaged by ware discharged from the conveyer, an electrical contact carried by said means, a second contact, the first mentioned contact carrying means adapted to bring the contacts into engagement by engagement upon it of ware, an electro-magnet adapted to move the lug to an inoperative position whereupon the cam may be revolubly actuated by the friction device, an electrical circuit embracing the contacts and the electro-magnet, a plunger adapted to operate upon ware discharged by the conveyer controlled by the cam, the cam being adapted to move the arm upon its pivotal mounting prior to the operation of the plunger upon the ware, means to oscillate the conveyer, a leer conveyer onto which the plunger is adapted to move the ware, and means to intermittingly actuate the leer conveyer upon the attainment by the endless conveyer of its lateral limits of oscillation.

11. In a device of the class described the combination of an endless conveyer, a shaft revolubly mounted on the conveyer, a cam revolubly mounted on the shaft, a friction device carried by the shaft adapted to impart movement to the cam, a lug normally resisting movement of the cam by the friction device, an arm pivotally mounted on the conveyer, means yieldingly retaining the forward end of the arm in engagement upon the cam, means carried by the rear end of the arm adapted to be engaged by ware discharged from the conveyer, an electrical contact carried by said means, a second contact, the first mentioned contact carrying means adapted to bring the contacts into engagement by engagement upon it of ware, an electro-magnet adapted to move the lug to an inoperative position whereupon the cam may be revolubly actuated by the friction device, an electrical circuit embracing the contacts and the electro-magnet, a plunger adapted to operate upon ware discharged by the conveyer controlled by the cam, the cam being adapted to move the arm upon its pivotal mounting prior to the operation of the plunger upon the ware, means to oscillate the conveyer, a leer conveyer onto which the plunger is adapted to move the ware, means to intermittingly actuate the leer conveyer upon the attainment by the endless conveyer of its lateral limits of oscillation, and means to revolubly actuate the shaft.

12. In a device of the class described the combination of a leer, a leer conveyer, a bottle machine, a conveyer for carrying bottles upon their sides from the bottle machine to the leer conveyer and for depositing the bottles with their bottoms upon the leer conveyer, and means for pushing the bottles over the leer conveyer when supported on their bottoms.

13. In a device of the class described the combination of a leer, a leer conveyer extending longitudinally of the leer, a conveyer extending longitudinally of the leer at one end thereof for depositing bottles upon the leer conveyer, and means for moving the bottles over the leer conveyer in the direction of movement of the leer conveyer after the second mentioned conveyer has deposited the bottle upon the leer conveyer.

14. In a device of the class described the combination of a leer having side walls and an end, the end having an opening therein, a leer conveyer movable longitudinally of the leer in substantial parallelism with the sides of the leer and projecting outwardly beyond the end having the said opening therein, a conveyer for depositing bottles upon the leer conveyer exteriorly of the leer and in alignment with the opening in the end, and means for moving bottles over the leer conveyer through the opening in the end after the bottles have been deposited on the leer conveyer.

15. In a device of the class described, the combination of a leer, a leer conveyer, a conveyer for carrying ware to the leer, means whereby to form a pocket for which the leer conveyer forms a bottom and into which pocket the other conveyer discharges the ware, means to move the ware from the pocket into the leer, and means controlled by the ware for controlling displacement of the pocket-forming means whereby to permit unobstructed action of the ware-moving means upon the ware.

16. In a device of the class described the combination of a conveyer having a way formed longitudinally thereof, a plate mounted for movement and disposed at one end of the way for forming a pocket at the end of said way, means for moving said plate for opening said pocket, means at said pocket for engagement by ware discharged into said pocket by said conveyer and controlling movement of the plate moving means, and means controlled by said last mentioned means for moving ware from the pocket upon the opening thereof.

17. In a device of the class described the combination of a conveyer having a way formed longitudinally thereof, a plate mounted for movement and disposed at one end of the way for forming a pocket at the end of said way, means for moving said plate for opening said pocket, means at said pocket for engagement by ware discharged into said pocket by said conveyer and controlling movement of the plate moving means, and a movable plunger plate for moving ware from the pocket when opened and controlled by the last mentioned means.

18. In a device of the class described the combination of a conveyer having a way formed longitudinally thereof, an arm pivotally mounted adjacent the way having its one end disposed at the end of the way and forming a pocket at the end of the way, and into which pocket the way is adapted to discharge, means for moving the arm about its pivotal mounting whereby to open the pocket, means associated with the arm adapted to be actuated by the discharge of ware into the pocket and controlling the movement of the arm about its pivotal mounting whereby to move the arm for opening the said pocket, and means to move the ware beyond the pocket after the opening thereof.

In testimony whereof, I have hereunto subscribed my name this 21st day of July, 1922.

PERCY Q. WILLIAMS.